(12) United States Patent
Lymberis (10) Patent No.: US 8,671,847 B2
(45) Date of Patent: Mar. 18, 2014

(54) HUNTING UTILITY TRAY AND FOLDING ARM ASSEMBLY

(76) Inventor: Dimitrios Lymberis, Upper Saddle River, NJ (US)

( * ) Notice: Subject to any disclaimer, the term of this patent is extended or adjusted under 35 U.S.C. 154(b) by 0 days.

(21) Appl. No.: 13/357,565

(22) Filed: Jan. 24, 2012

(65) Prior Publication Data

US 2013/0186310 A1    Jul. 25, 2013

(51) Int. Cl.
*A47B 23/00*    (2006.01)

(52) U.S. Cl.
USPC .................................................. 108/42

(58) Field of Classification Search
USPC ............ 108/42, 152, 157.1, 157.13, 157.16; 248/274.1, 282.1, 284.1, 216.1, 217.3
See application file for complete search history.

(56) References Cited

U.S. PATENT DOCUMENTS

| | | | |
|---|---|---|---|
| 866,463 A * | 9/1907 | Hart | 248/208 |
| 3,990,537 A * | 11/1976 | Swenson | 182/187 |
| 4,369,858 A | 1/1983 | Babb | |
| 4,787,590 A * | 11/1988 | Melvin | 248/291.1 |
| 5,156,096 A | 10/1992 | Lamprey | |
| 5,562,180 A | 10/1996 | Herzog et al. | |
| 5,680,943 A * | 10/1997 | Robley | 211/171 |
| 5,706,740 A | 1/1998 | Keller, Jr. | |
| 5,743,353 A | 4/1998 | Browning et al. | |
| 5,769,372 A * | 6/1998 | Klosterman | 248/219.4 |
| 5,918,550 A | 7/1999 | Weir et al. | |
| 6,205,935 B1 | 3/2001 | Lindaman | |
| 6,478,272 B1 * | 11/2002 | McKinsey et al. | 248/216.1 |
| 7,017,449 B1 | 3/2006 | Ritchings | |
| 7,461,822 B2 | 12/2008 | Edwards | |
| 7,516,707 B2 | 4/2009 | Schrot | |
| 8,302,922 B1 * | 11/2012 | Robinson | 248/219.4 |
| 2007/0045490 A1 | 3/2007 | Edwards | |
| 2007/0295870 A1 * | 12/2007 | Peterson et al. | 248/125.7 |
| 2010/0102184 A1 | 4/2010 | Gorsuch et al. | |

\* cited by examiner

*Primary Examiner* — Matthew Ing
(74) *Attorney, Agent, or Firm* — Katsougrakis Law Firm, P.C.

(57) ABSTRACT

A hunting tray is presented that is configured to be removably attached to a tree. The hunting tray includes a body portion having a top surface, a bottom surface, and side surfaces, the top surface of the body portion dimensioned and configured to receive at least one item and a folding arm assembly detachably connectable to the body portion, the folding arm assembly configured to include at least one attachment member at a distal end thereof for facilitating removable attachment of the hunting tray to the tree. The at least one attachment member is a tapered screw. The folding arm assembly includes a first arm segment, a second arm segment, and a third arm segment, such that the first and second arm segments are pivotally connected to each other and the second and third arm segments are pivotally connected to each other.

20 Claims, 7 Drawing Sheets

HUNTING UTILITY TRAY AND FOLDING ARM ASSEMBLY

BACKGROUND

1. Field of the Related Art

The present disclosure relates to hunting accessories, and more particularly, but not exclusively, to a hunting utility tray capable of being removably attachable to a stationary structure, for example, a tree.

2. Description of the Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Therefore, unless otherwise indicated herein, what is described in this section is not prior art to the description and claims in this application and is not admitted to be prior art by inclusion in this section.

In the sport of hunting, a commonly used strategy for the hunter is to secure a position to observe prey, while remaining concealed and unnoticed. Many types of shelters, blinds and/or camouflages are used for this purpose. A particularly useful device employed by a hunter is a tree or an elevated stand, which permits the hunter to be concealed as well as remain relatively comfortable for long periods of time. Moreover, hunting supplies that are typically carried by a hunter may include, for example, food, drinks, binoculars, a radio, a grunt call, rattling antlers, firearms, ammunition, and a flashlight. Upon reaching his/her location, the hunter requires a means to store and manage these items so that they are easily accessible at a moment's notice, without requiring substantial movement or causing any sound that may be audible to prey.

While pant pockets and backpacks provide adequate storage for carrying items to the hunting location, both have limitations for managing items while in the tree stand. Pant pockets are limited in size and capacity, and may be cumbersome to retrieve items therefrom. A backpack is awkward to access while in a seated position and items are typically unmanaged and difficult to find from therewithin. Furthermore, the opening and closing of backpack zippers causes unnecessary and disturbing noise that could easily result in the hunter being detected by prey. Items may be removed from pockets and backpacks upon arriving to the tree stand, but current methods of storing and managing items on the tree stand seat or around the neck of the hunter are not optimal. When items are stored in a haphazard manner or out of convenient reach of the hunter, they may hinder rather than aid the hunter's sport.

While trays themselves have long been utilized in other fields of art to store and manage supplies, it is believed that the hunting industry has not fully appreciated the need for them and their utility and advantages. Therefore, there is a need in the art for accessories to assist the hunter in organizing and accessing his equipment and supplies, without requiring substantial movement from his seated position or perceptible noise.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The present disclosure provides for a hunting tray configured to be removably attached to a tree. The hunting tray includes a body portion that has a top surface, a bottom surface, and side surfaces. The top surface of the body portion is dimensioned and configured to receive one or more items, such as, but not limited to a cup, a beverage, food, a firearm, a binocular, a camera, bullets, hunting tools, hunting accessories, and electronic devices or a combination thereof. The hunting tray also includes a folding arm assembly that is detachably connectable to the body portion. The folding arm assembly is configured to include one or more attachment members at a distal end thereof for facilitating removable attachment of the hunting tray to the tree. For example, the attachment member may be a tapered screw.

In another exemplary embodiment, the folding arm assembly includes a first arm segment, a second arm segment, and a third arm segment, such that the first and second arm segments are pivotally connected to each other and the second and third arm segments are pivotally connected to each other.

In yet another exemplary embodiment, the first arm segment folds into the second arm segment into a first configuration. Additionally, the folded first and second arm segments further fold into the third arm segment into a second configuration.

In yet another exemplary embodiment, the first arm segment has a first length, the second arm segment has a second length, and the third arm segment has a third length, where the third length is greater than the second length and the second length is greater than the first length.

Additionally, the body portion is constructed from a first material and the folding arm assembly is constructed from a second material, wherein the first material may be different than the second material. For example, the first material may be plastic and the second material may be aluminum, or vice versa.

In an exemplary embodiment, the top surface of the body portion may include a recess for receiving one or more items thereon. Alternatively, the top surface of the body portion may include one or more openings for receiving one or more items therethrough.

The present disclosure also provides a hunting utility tray, which includes a body component dimensioned and configured to receive one or more items thereon or therethrough and a first arm pivotally connected to a second arm. The second arm is pivotally connected to a third arm, such that the first, second, and third arms form a series configuration when unfolded. The third arm includes a tapered screw at a distal end thereof for facilitating removable attachment of the hunting utility tray to the tree.

A method of removably attaching a hunting tray to a tree is also presented. The method includes the steps of inserting a tapered screw into the tree, the tapered screw being attached to a distal end of a folding arm assembly. In another step, a first arm segment and a second arm segment are unfolded from the folding arm assembly such that the first arm segment is pivotally connected to the second arm segment. In another step, the hunting tray is attached to the first arm segment. In another step, one or more recesses and openings are formed on a top surface of the hunting tray. In another step, one or more items are placed or received on the one or more recesses or through the plurality of openings of the top surface of the hunting tray.

Further scope of applicability of the present disclosure will become apparent from the detailed description given hereinafter. However, it should be understood that the detailed description and specific examples, while indicating embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

Various embodiments of the present disclosure will be described herein below with reference to the figures wherein.

The figures depict embodiments of the present disclosure for purposes of illustration only. One skilled in the art will readily recognize from the following discussion that alternative embodiments of the structures and methods illustrated herein may be employed without departing from the principles of the present disclosure described herein.

DETAILED DESCRIPTION

The present disclosure pertains to a hunting tray for a hunter that may be removably affixed to a tree or any other suitable structure. An additional object of the present disclosure is to provide a tray organizer that is easily accessible to the hunter while he or she is situated on or near a tree (e.g., seated on an elevated stand), without requiring noticeable movement or noise. Another object of the present disclosure is to provide a gear management system that may be disassembled for easy packing for transportation to and from the hunting location. Still yet another object of the present disclosure is to provide a gear management system so that a hunter can hang any suitable hunting accessory nearby and/or within reach.

The present disclosure provides a tray or shelf that may be affixed to or otherwise integrated with a tree or other structure. The storage areas, tray, openings, and recesses of embodiments of the present disclosure furnish a convenient and spacious place to store items needed by the hunter during his extended wait for prey. Embodiments of the present disclosure may be manufactured from non-reflective, high-density polyethylene or other materials, and may be water resistant or weatherproof.

The components of the hunting tray may be made of molded plastic, such as polystyrene, making it lightweight, economical and easy to manufacture, relatively durable, rigid, and strong. The hunting tray or portions thereof may, however, be made of other or additional materials, including but not limited to wood, which may add further stability and rigidity to the tray. One skilled in the art may contemplate using a plurality of different materials.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is intended to cover all modifications, equivalents, and alternatives falling within the spirit and scope of the present disclosure as defined by the claims. Like numbers refer to like elements throughout the description of the figures.

Prior to describing the present disclosure in further detail, it will first be helpful to define various terms that will be used throughout the following discussion.

For example, the term "connect" or "connecting" may refer at least to adhere, affix, anchor, attach, band, bind, bolt, bond, brace, button, cohere, fasten, couple, embed, establish, fix, grip, hold, hook, implant, link, lock, lodge, screw, seal, rivet, tack on, tighten, or unite. The term "connect" or "connecting" may at least refer to linking/fastening/attaching/locking any type of materials, units, components, and/or elements in a removable, detachable, and/or interchangeable manner. The term "connect" or "connecting" may also refer to at least materials or units or components or elements associated with each other or in operable communication with each other or cooperating with each other or in operative communication with each other. The term "connect" may be used interchangeably with the terms "cooperate" and/or "attach."

The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

Reference will now be made in detail to embodiments of the present disclosure. While certain embodiments of the present disclosure will be described, it will be understood that it is not intended to limit the embodiments of the present disclosure to those described embodiments. To the contrary, reference to embodiments of the present disclosure is intended to cover alternatives, modifications, and equivalents as may be included within the spirit and scope of the embodiments of the present disclosure as defined by the appended claims.

Embodiments will be described below while referencing the accompanying figures. The accompanying figures are merely examples and are not intended to limit the scope of the present disclosure.

In FIGS. 1-7, the hunter's utility tray assembly 100 includes a body portion 110 and a folding arm assembly 120.

Figure 1:
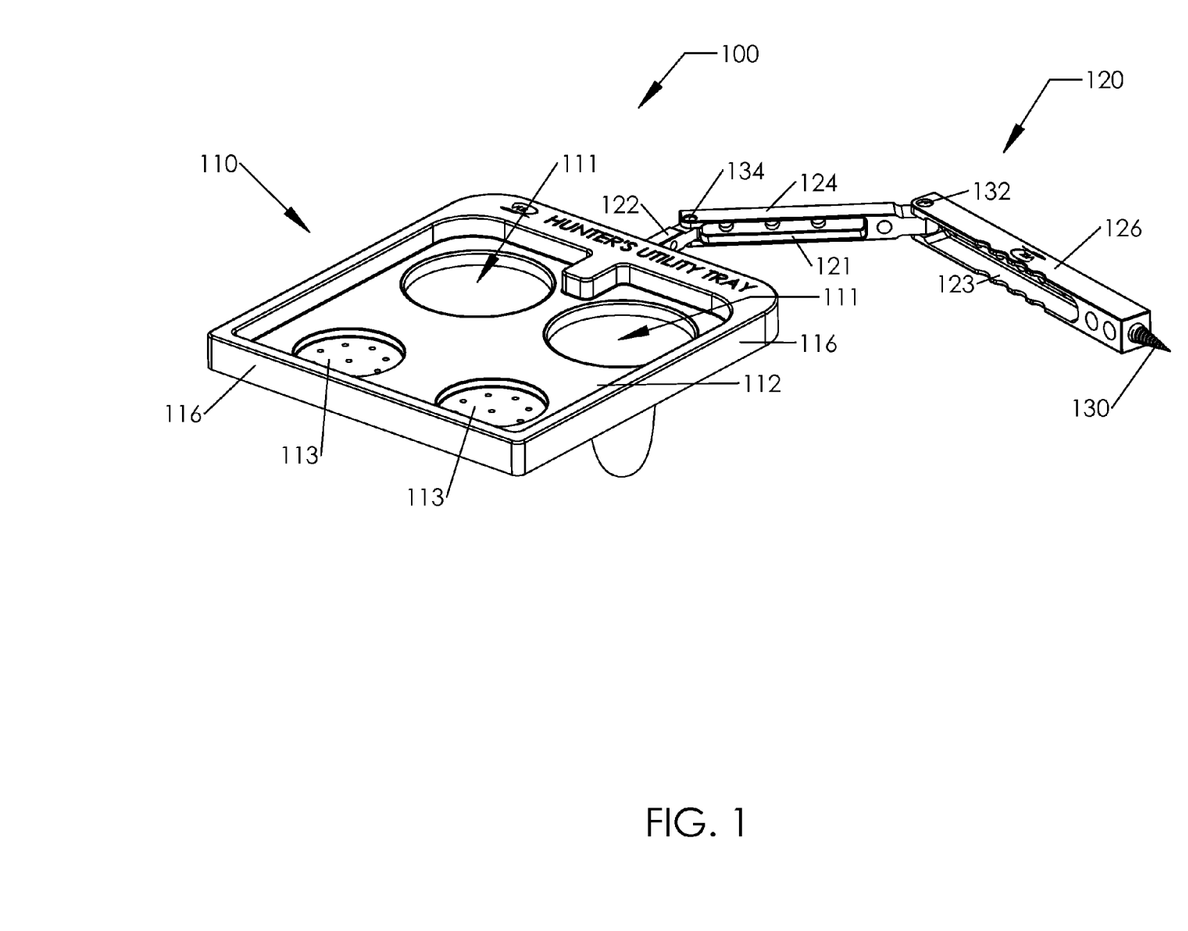
FIG. 1 is a perspective view of a hunter's utility tray assembly, in accordance with the present disclosure.
Figure 2:
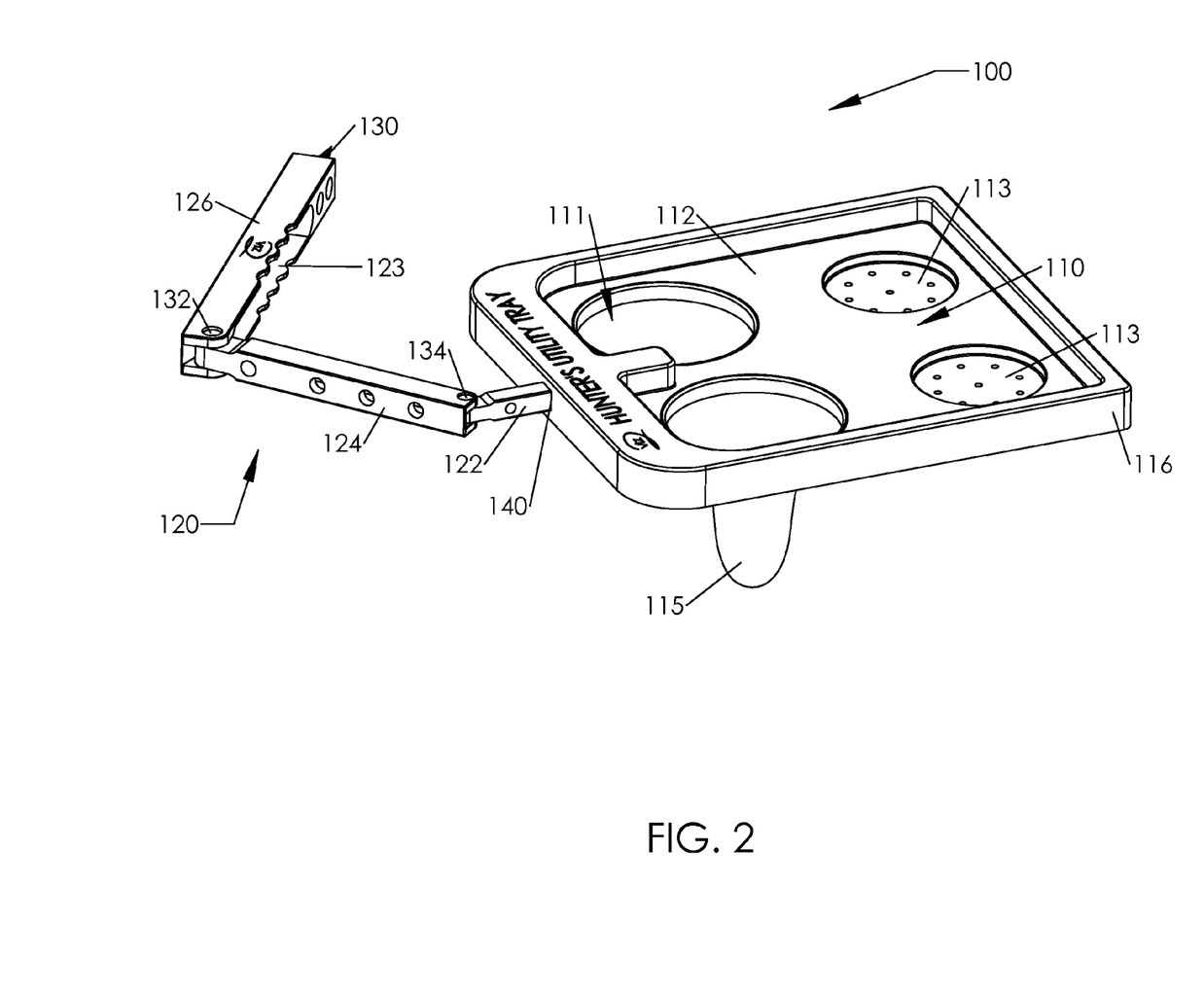
FIG. 2 is a perspective right side view of the hunter's utility tray assembly of FIG. 1, in accordance with the present disclosure.
Figure 3:
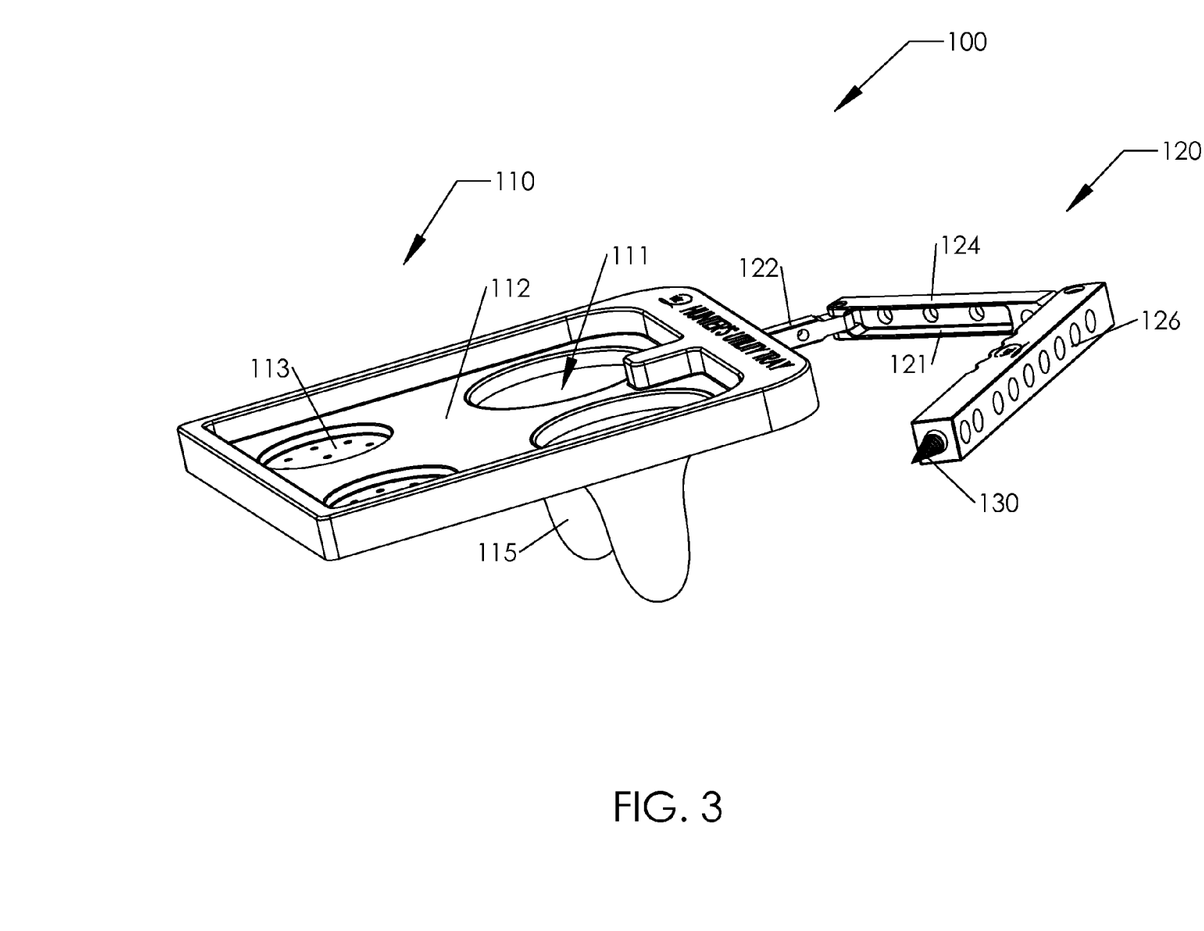
FIG. 3 is a perspective left side view of the hunter's utility tray assembly of FIG. 1, in accordance with the present disclosure.
Figure 4:
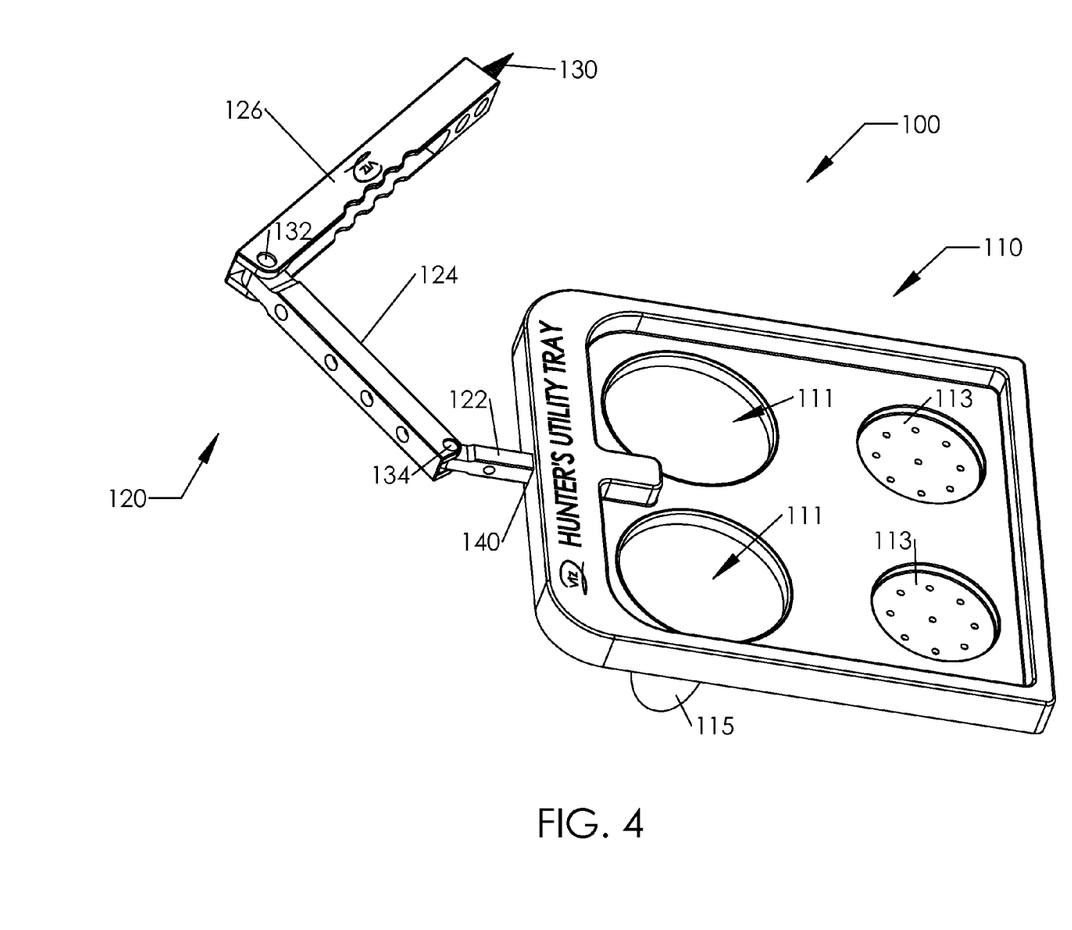
FIG. 4 is a perspective top view of the hunter's utility tray assembly of FIG. 1, in accordance with the present disclosure.
Figure 5:
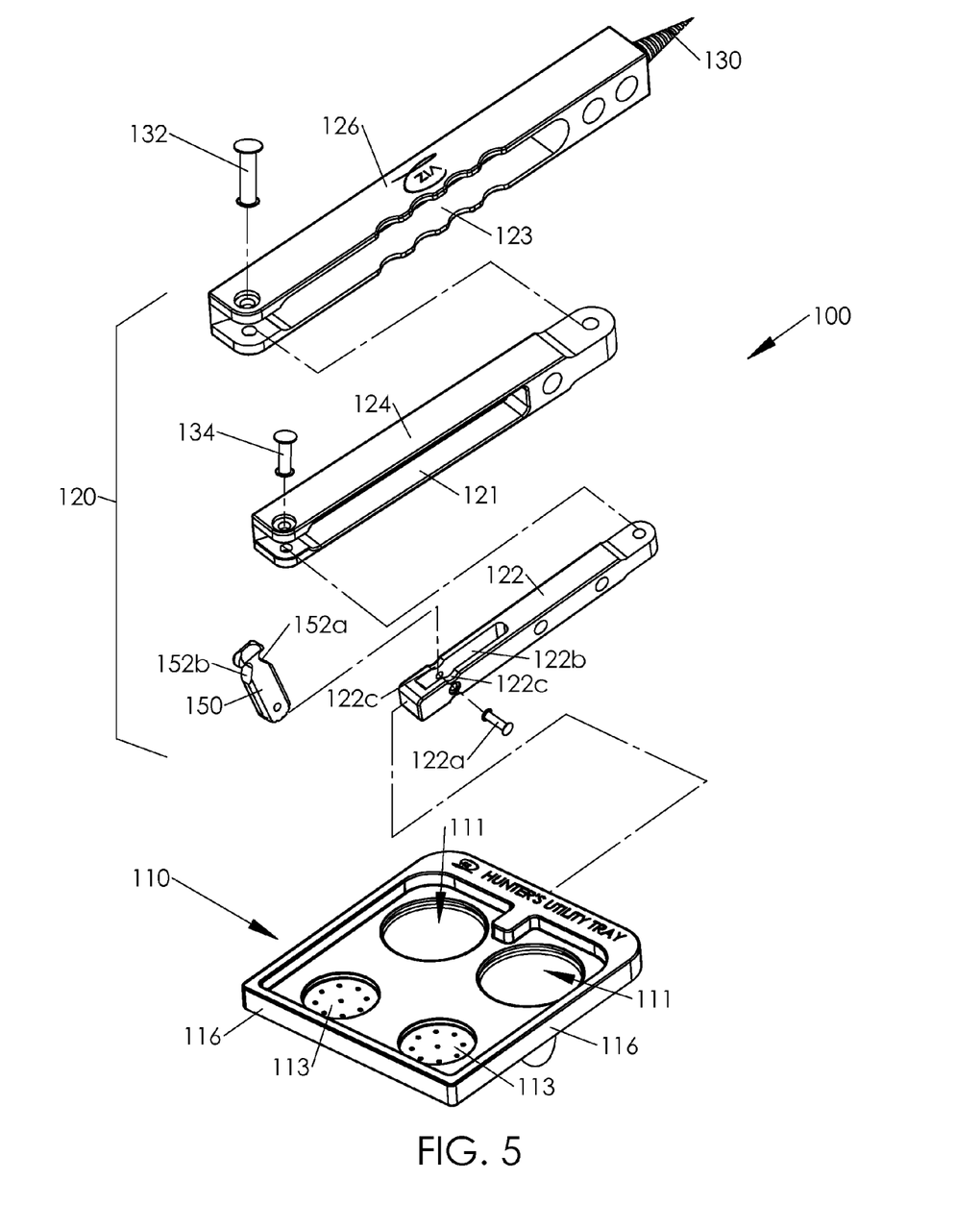
FIG. 5 is an exploded view of the hunter's utility tray assembly of FIG. 1, in accordance with the present disclosure.
Figure 6:
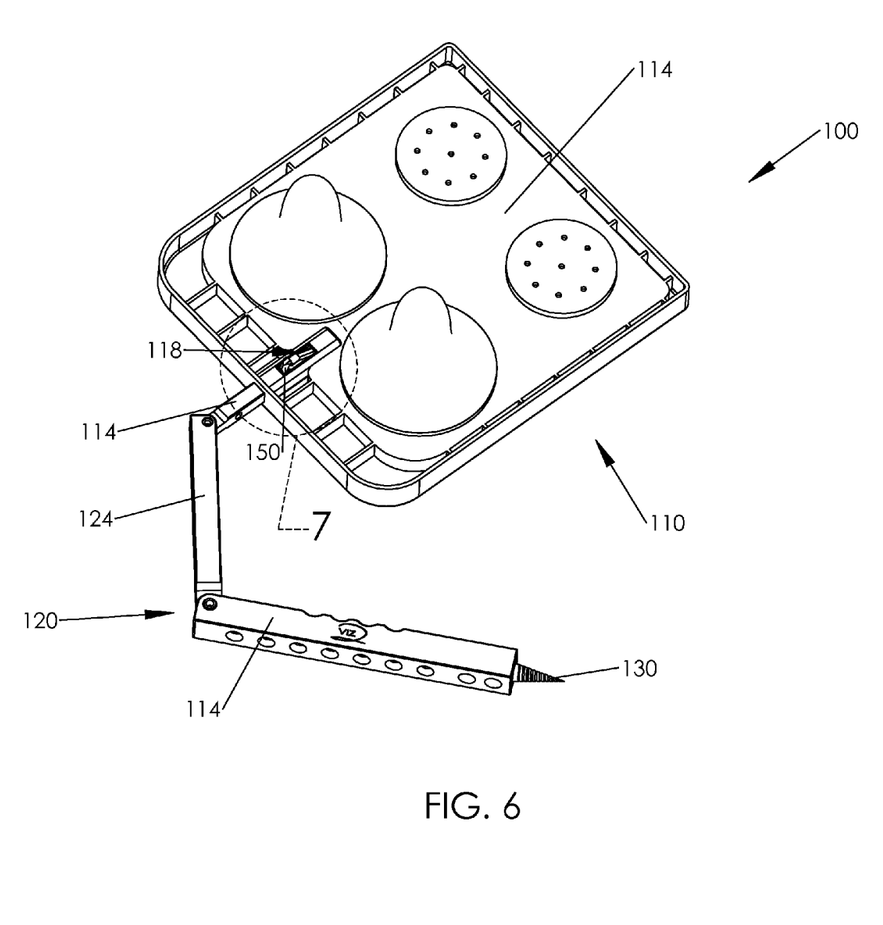
FIG. 6 is a perspective bottom view of the hunter's utility tray assembly of FIG. 1, in accordance with the present disclosure.
Figure 7:
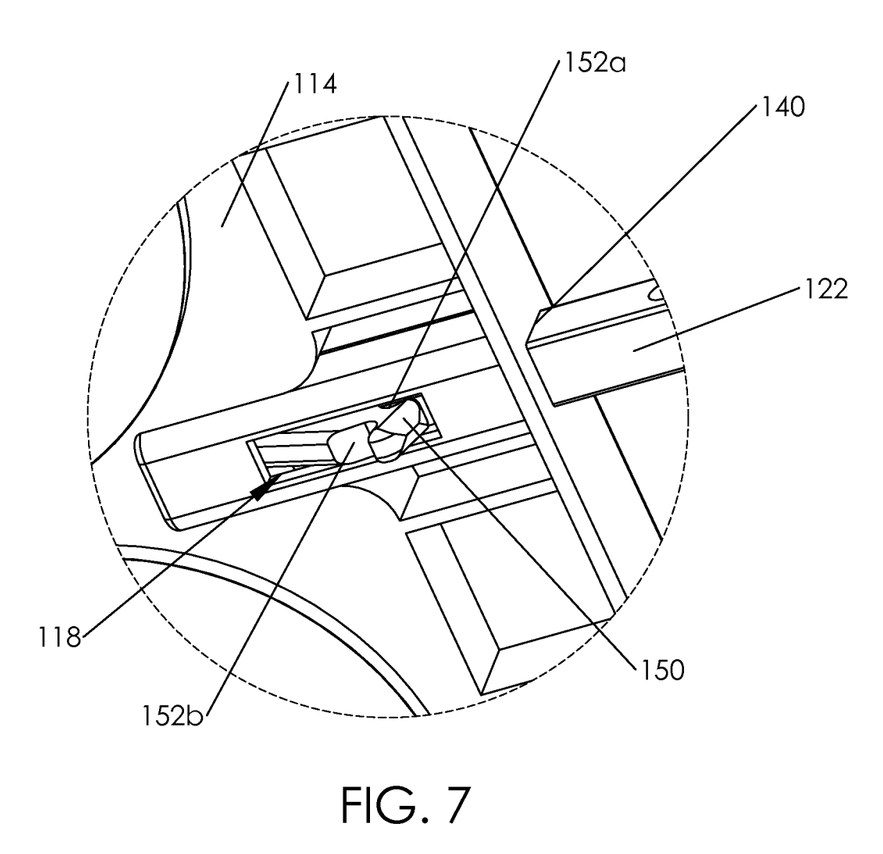
FIG. 7 is an enlarged view of the depicted area indicated in FIG. 6, in accordance with the present disclosure.

With reference to FIG. 1, there is presented a perspective view of a hunter's utility tray assembly 100, in accordance with the present disclosure. FIG. 2 illustrates a perspective right side view of the hunter's utility tray assembly 100 of FIG. 1, whereas FIG. 3 illustrates a perspective left side view of the hunter's utility tray assembly 100 of FIG. 1, in accordance with the present disclosure. FIG. 4 illustrates a perspective top view of the hunter's utility tray assembly 100 of FIG. 1, whereas FIG. 5 is an exploded view of the hunter's utility tray assembly 100. FIG. 6 illustrates a perspective bottom view of the hunter's utility tray assembly 100 of FIG. 1, whereas FIG. 7 is an enlarged detailed view of an indicated area of bottom view of the hunter's utility tray of FIG. 6.

The body portion 110 has a top surface 112, a bottom surface 114, and side surfaces 116. The body portion 110 is constructed in a rectangular configuration. However, one skilled in the art may contemplate a plurality of different shapes for the construction of the body portion 110, such as, but not limited to, circular, hexagonal, and crescent-shaped. The top surface 112 is configured to receive hunting supplies, a laptop, a tablet pc, a smartphone, or any other suitable device that a hunter would need. The body portion 110 includes a plurality of openings 111 and a plurality of recesses 113. The plurality of openings 111 may be configured to receive, for example, but not limited to a beverage and hunting accessories. The plurality of recesses 113 may be configured to hold, for example, a beverage thereon. The plurality of openings 111 may each include a cover 115 distally disposed thereof for holding at least one item, as defined below (see FIG. 2). The cover 115 may be constructed so as to form a pocket to place or hold at least one item therein.

One skilled in the art may contemplate a plurality of different items positioned on the top surface 112, on the plurality of recesses 113 and/or within the plurality of openings 111. For example, at least one item may be at least one of a cup, a beverage, food, a firearm, a binocular, a camera, bullets, hunting tools, hunting accessories, and electronic devices or a combination thereof. Additionally, the plurality of openings 111 and the plurality of recesses 113 are shown in a substantially circular configuration. However, one skilled in the art may envision a plurality of different shapes and sizes for the plurality of openings 111 and the plurality of recesses 113. Furthermore, the openings 111 are depicted next to each other on one side of the top surface 112 of the body portion 110. Similarly, the plurality of recesses 113 are depicted next to each other on the other side of the top surface 112 of the body portion 110. However, it is envisioned that the plurality of openings 111 and the plurality of recesses 113 may be positioned in an alternating positional manner/fashion with respect to each other across the top surface 112 of the body portion 110. It is also envisioned that more than two openings 111 and more than two recesses 113 may be positioned on the top surface 112 of the body portion 110. The bottom surface 114 of the body portion 110 includes an opening 118 (see FIGS. 6 and 7) to facilitate secure engagement of the folding arm assembly 120, as will be described in further detail below.

The folding arm assembly 120 may be detachably connected to the body portion 110 at connection point 140 (see FIG. 2). The folding arm assembly 120 is configured to include at least one attachment member 130 at a distal end thereof The attachment member 130 may be a tapered screw 130, as illustrated in FIGS. 1-6. The tapered screw 130 facilitates the removable attachment of the hunting tray assembly 100 to a stationary structure, for example, but not limited to a tree (not shown).

The folding arm assembly 120 includes a first arm segment 122, a second arm segment 124, and a third arm segment 126. The first arm segment 122 is pivotally connected via pivot mechanism 134 (e.g., a pin) to the second arm segment 124. The second arm segment 124 is pivotally connected via pivot mechanism 132 (e.g., a pin) to the third arm segment 126. When in an unfolded configuration, the first arm segment 122, the second arm segment 124, and the third arm segment 126 may be positioned to form a substantially straight configuration. As can be appreciated by one skilled in the art one or more arm segments (e.g., four arm segments) may be used to form a folding arm assembly 120.

Referring to FIGS. 5-7, the first arm segment 122 includes a locking pin 150 that is pivotally connected via pivot mechanism 122a (e.g., a pin) within the first arm segment 122. The locking pin 150 includes a recess 152a on one side the locking pin 150 and a recess 152b on the other side of the locking pin 150. The locking pin 150 is configured to be positioned within a recess 122b of the first arm segment 122. The first arm segment 122 also includes indents 122c that may be used in conjunction with the recess 152a of the locking pin 150 to secure a hunting accessory (e.g., a bow) therebetween. More particularly, the locking pin 150 may be pivotally adjusted such that a hunting accessory may be positioned between the recess 152a of the locking pin 150 and the indents 122c of the first segment 122 to thereby secure a hunting accessory, such as, for example, a bow, between the recess 152a and the indents 122c. In this configuration, the folding arm assembly 120 may be secured to a stationary structure, for example, but not limited to a tree, without the body portion 110 being attached to the folding arm assembly 120.

In embodiments, the first arm segment 122 has a first length, the second arm segment 124 has a second length, and the third arm segment 126 has a third length. The third length is greater than the second length and the second length is greater than the first length. As such, each arm segment 122, 124, 126 has a different length. However, one skilled in the art may contemplate a plurality of different or the same lengths (or widths) for first, second, and third arm segments 122, 124, 126. The dimensions of first, second, and third arm segments 122, 124, 126 may be constructed according to manufacturing preferences.

Moreover, the first, second, and third arm segments 122, 124, 126 of the folding arm assembly 120 provide for stabilization and anchoring of the body portion 110 to a tree via the tapered screw 130. The tapered screw 130 may advance from a few millimeters up to a few inches within a tree in order to provide for the required stabilization and anchoring of the hunting tray assembly 100. The tapered screw 130 advances horizontally through the tree trunk. The tapered screw 130 is in the same plane as the arm segments 122, 124, 126 of the folding arm assembly 120 and is in the same plane as the body portion 110 of the hunter's tray assembly 100. Thus, all the components of the hunting tray assembly 100 move or advance or are forced to propel within the same plane, the plane being perpendicular to the tree trunk. However, one skilled in the art can stabilize and anchor the folding arm assembly 120 in an angled configuration.

Still referring to the folding arm assembly 120, the first arm segment 122 may be folded into first recess 121 of second arm segment 124, thus forming a first folded configuration. Then, the folded first and second arm segments 122, 124 may be further folded into second recess 123 of the third arm segment 126, thus forming a second folding configuration. Therefore, the first arm segment 122 may be incorporated or embedded within second arm segment 124 via a first recess 121, whereas the first and seconds arm segments 122, 124 may be incorporated or embedded within the third arm segment 126 via a second recess 123. Therefore, each arm 122, 124 may fold or collapse into each other.

Additionally, with regard to the folding arm assembly 120, the arm segments 122, 124, 126 allow for a selective distance adjustment of the body portion 110 of the hunter's tray assembly 100 with respect to the tree trunk. For example, the body portion 110 of the hunter's tray assembly 100 may extend a horizontal distance from the tree trunk. The horizontal distance may be adjusted by the hunter and may vary from a few millimeters to a few feet. Thus, the body portion 110 of the hunter's tray assembly 100 is not always adjacent to or does not always abut the tree trunk, but instead may be selectively adjusted away from the tree trunk at any desired distance. Stated differently, the body portion 110 is movable with respect to the location of the tree trunk. Moreover, the selective adjustment is a substantially horizontal adjustment in a horizontal orientation with respect to the tree trunk. In other words, the tree trunk is perpendicular to the horizontal movement or orientation of the hunter's tray assembly 100.

The first recess 121 may extend the entire length of the second arm segment 124. However, it is contemplated that the first recess 121 extends only a portion of the length of the second arm segment 124. Additionally, the second recess 123 may extend the entire length of the third arm segment 126. However, it is contemplated that the second recess 123 extends only a portion of the length of the third arm segment 126.

In an alternative exemplary embodiment, the first arm segment 122 may extend through at least a portion of the body portion 110 in order to provide for proper stabilization and anchoring of the hunting tray assembly 100 to a tree. As shown in FIGS. 1-4, the first arm segment 122 extends less than a quarter of the length of the body portion 110. However, one skilled in the art may contemplate extending the first arm segment 122 to half the length of the body portion 110 or to the entire length of the body portion 110 in order to create a desired strength of stabilization to the tree. Thus, at least a portion of the first arm segment 122 is incorporated or embedded within the body portion 110. The entire length of the first arm segment 122 is shown in the exploded view of FIG. 5.

The body portion 110 may be constructed from a first material, whereas the folding arm assembly 120 may be constructed from a second material. The first material may be different than the second material. For example, the first material may be ABS plastic, whereas the second material may be aluminum. One skilled in the art may contemplate using a plurality of different materials, including composite materials, in order to construct the body portion 110 and the folding arm assembly 120.

Once the tapered screw 130 is inserted into the tree trunk, for example, via an actuating mechanism (e.g., a screwdriver) and/or by rotating the folding arm assembly 120, the folding arm assembly 120 is parallel to or on the same longitudinal axis in relation with the tapered screw 130. Then, a hunter or other user may extend the second arm segment 124 outside the third arm segment 126. The second arm segment 124 may swivel or swing 360° degrees in relation to its initial position (i.e., incorporated within the third arm 126) via the pivot point mechanism 132. Then the user may extend the first arm segment 122 outside the second arm segment 124. The first arm segment 122 may swivel or swing 360° degrees in relation to its initial position (i.e., incorporated within the second arm 124) via the pivot point mechanism 134. Thereafter, the user may connect the hunting tray assembly 100 to the first arm segment 122 via the connection point 140 (see FIGS. 2, 6 and 7). The connection point 140 may be any suitable attaching mechanism. However, one skilled in the art may contemplate a plurality of different connection mechanisms.

In operation or use, a user or hunter may insert the tapered screw 130 into a tree, the tapered screw 130 being attached to a distal end of a folding arm assembly 120. Then the user may unfold a first arm segment 122 and a second arm segment 124 from the folding arm assembly 120, the first arm segment 122 pivotally connected to the second arm segment 124. Thereafter, the user may attach the body portion 110 to the first arm segment 122.

In embodiments, the body portion 110 is secured to the folding arm assembly 120 via the locking pin 150 (see FIGS. 6 and 7). As shown in FIGS. 6 and 7, as the first arm segment 122 is inserted within the body portion 110 at the connection point 140, the locking pin 150 drops or manually pivoted into the opening 118 to facilitate secure engagement of the folding arm assembly 120 within the body portion 110. More particularly, the recess 152a of the locking pin 150 engages the bottom surface 114 of the body portion 110 when the folding arm assembly is pulled out of the body portion 110 thereby locking the folding arm assembly 120 within the body portion 110. To release the folding arm assembly 120 from the body portion 110, the locking pin 150 must be manually pivoted by a user within the opening 118 to allow the first arm segment 122 of the folding arm assembly 120 to be released from within the body portion 110. Once the locking pin 150 is positioned within the opening 118 and the recess 122b (see FIG. 5), then the folding arm assembly 120 may be pulled out of the body portion 110.

A plurality of recesses 113 and a plurality of openings 111 on the top surface 112 of the body portion 110 allow the user to have the body portion 110 receive a plurality of items (not shown) on the plurality of recesses 113 or through the plurality of openings 111 of the top surface 112 of the body portion 110. When the hunter wishes to move to a new hunting location, the hunter may remove the hunting tray assembly 100. The hunter may unscrew the tapered screw 130 from the tree trunk and fold the first arm segment 122 into the second arm segment 124, and then the first and second arm segments 122, 124 into the third arm segment 126, thus forming a folding or collapsed configuration. The body portion 110 and the folding assembly 120 may be assembled and disassembled with every use, thus providing quick and efficient portability from one hunting location to another.

In summary, the present disclosure overcomes an inherent inability in conventional utility storage systems to provide secure and organized storage for articles within or on a tray, which provides hunters' quick and easy access to the articles/items. A new and novel mounting method and apparatus is presented herein, that enables a mounting location on a tree or other structure that provides the user with quick and easy access to the contents of the utility storage system, as compared to conventional utility storage systems.

The present disclosure overcomes an inherent inability in conventional systems to protect the stored contents within the system from shock, vibration, and sudden impact by providing a stable arm that connects directly to a tree. Furthermore, the present disclosure provides the user with a greatly improved level of flexibility by allowing the user to quickly and easily change the size, shape and configuration of the storage system to best suit the articles/items to be stored or secured, and also by allowing the user to easily transfer the utility storage system of the present disclosure from one hunting location to another hunting location.

The hunting tray described herein may be referred to as a hunting utility tray with a swingable folding arm, a hunting utility shelf with a swinging folding arm, a hunting multimedia tray with a swinging foldable arm, a beverage holding tray with a swinging foldable arm and/or a hunting comfort system for aiding the hunter in storing and easily accessing hunting tools and/or accessories. For example, a hunter can place a laptop, a tablet pc, a smartphone, or any other suitable electronic device on top of the hunting tray. The hunting tray may be a tree-mounted hunting tray. However, one skilled in the art may contemplate attaching or connecting the hunting tray to a plurality of different structures found in the woods or in nature, or to a vehicle.

It will be appreciated that various embodiments of hunting trays may be employed in a variety of applications and, accordingly, variables including, but not limited to, the geometry defined by a tray, as well as the size, and/or orientation of the body component may be varied either alone or in various combinations as required to suit a particular application and/or to facilitate achievement of one or more desired results. In one example, shorter or longer body component sections may be employed to suit a particular desired application.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

It should be noted that the language used in the specification has been principally selected for readability and instructional purposes, and may not have been selected to delineate or circumscribe the inventive subject matter. Accordingly, the disclosure is intended to be illustrative, but not limiting, of the scope of the present disclosure.

The foregoing examples illustrate various aspects of the present disclosure and practice of the methods of the present disclosure. The examples are not intended to provide an exhaustive description of the many different embodiments of the present disclosure. Thus, although the foregoing present disclosure has been described in some detail by way of illustration and example for purposes of clarity and understanding, those of ordinary skill in the art will realize readily that many changes and modifications may be made thereto without departing form the spirit or scope of the present disclosure.

What is claimed is:

1. A hunting tray configured to be removably attached to a tree, the hunting tray comprising:
    a body portion having a top surface, a bottom surface, and side surfaces, the top surface of the body portion dimensioned and configured to receive at least one item; and
    a swivelable arm assembly detachably connectable to the body portion, the swivelable arm assembly configured to include at least one attachment member at a distal end thereof for facilitating removable attachment of the hunting tray to the tree;
    wherein the swivelable arm assembly includes a first arm segment, a second arm segment, and a third arm segment, the first arm segment configured to fold into the second arm segment in a first configuration, the folded first and second arm segments further configured to fold into the third arm segment in a second configuration;
    wherein the second arm segment includes two pivot points on opposed ends thereof, such that the first arm segment folds into the second arm segment via the first pivot point at one end and the folded first and second arm segments fold into the third arm segment via the second pivot point at the other end; and
    wherein the first, second, and third arm segments are configured to travel on a single, common plane.

2. The hunting tray according to claim 1, wherein the at least one attachment member is at least one tapered screw.

3. The hunting tray according to claim 1, wherein the first and second arm segments are pivotally connected to each other and the second and third arm segments are pivotally connected to each other.

4. The hunting tray according to claim 1, wherein the single, common plane extends through the body portion of the hunting tray.

5. The hunting tray according to claim 1, wherein a latch member in conjunction with the first pivot point connects the first arm segment to the second arm segment.

6. The hunting tray according to claim 1, wherein the first arm segment has a first length, the second arm segment has a second length, and the third arm segment has a third length, where the third length is greater than the second length and the second length is greater than the first length.

7. The hunting tray according to claim 1, wherein the body portion is constructed from a first material and the swivelable arm assembly is constructed from a second material, the first material being different than the second material.

8. The hunting tray according to claim 1, wherein the the body portion is adapted and dimensioned to receive at least a portion of the first arm segment therein.

9. The hunting tray according to claim 1, wherein the top surface of the body portion includes at least one recess for receiving the at least one item thereon.

10. The hunting tray according to claim 1, wherein the top surface of the body portion includes at least one opening for receiving the at least one item therethrough.

11. The hunting tray according to claim 1, wherein the at least one item is at least one of a cup, a beverage, food, a firearm, a binocular, a camera, bullets, hunting tools, hunting accessories, and electronic devices or a combination thereof.

12. A hunting utility tray configured to be removably attached to a tree, the hunting utility tray comprising:
    a body component dimensioned and configured to receive at least one item thereon or therethrough; and
    a first arm pivotally connected to a second arm, the second arm pivotally connected to a third arm, such that the first, second, and third arms form a series configuration when unfolded;
    wherein the third arm includes a tapered screw at a distal end thereof for facilitating removable attachment of the hunting utility tray to the tree;
    wherein the first arm is configured to fold into the second arm in a first configuration, the folded first and second arms further configured to fold into the third arm in a second configuration;
    wherein the second arm includes two pivot points on opposed ends thereof, such that the first arm folds into the second arm via the first pivot point at one end and the folded first and second arms fold into the third arm via the second pivot point at the other end; and
    wherein the first, second, and third arms are configured to travel on a single, common plane.

13. The hunting utility tray according to claim 12, wherein the single, common plane extends through the body component of the hunting tray.

14. The hunting utility tray according to claim 12, wherein a latch member in conjunction with the first pivot point connects the first arm to the second arm.

15. The hunting utility tray according to claim 12, wherein the first arm has a first length, the second arm has a second length, and the third arm has a third length, where the third length is greater than the second length and the second length is greater than the first length.

16. The hunting utility tray according to claim 12, wherein the body component is constructed from a first material and the first, second, and third arms are constructed from a second material, the first material being different than the second material.

17. The hunting utility tray according to claim 12, wherein the body component is adapted and dimensioned to receive at least a portion of the first arm segment therein.

18. The hunting utility tray according to claim 12, wherein the at least one item is at least one of a cup, a beverage, food, a firearm, a binocular, a camera, bullets, hunting tools, hunting accessories, and electronic devices or a combination thereof.

19. A method of removably attaching a hunting tray to a tree, the method comprising:
- inserting a tapered screw into the tree, the tapered screw attached to a distal end of a swivelable arm assembly;
- unfolding a first arm segment and a second arm segment from the swivelable arm assembly, the first arm segment pivotally connected to the second arm segment;
- attaching the hunting tray to the first arm segment;
- forming a plurality of recesses and a plurality of openings on a top surface of the hunting tray; and
- receiving a plurality of items on the plurality of recesses or through the plurality of openings of the top surface of the hunting tray;
- wherein the swivelable arm assembly includes the first arm segment, the second arm segment, and a third arm segment, the first arm segment configured to fold into the second arm segment in a first configuration, the folded first and second arm segments further configured to fold into the third arm segment in a second configuration;
- wherein the second arm segment includes two pivot points on opposed ends thereof, such that the first arm segment folds into the second arm segment via the first pivot point at one end and the folded first and second arm segments fold into the third arm segment via the second pivot point at the other end; and
- wherein the first, second, and third arm segments are configured to travel on a single, common plane.

20. The method according to claim 19,
- wherein the first arm segment has a first length, the second arm segment has a second length, and the swivelable arm assembly has a third length, where the third length is greater than the second length and the second length is greater than the first length;
- wherein the hunting tray is constructed from a first material and the swivelable arm assembly is constructed from a second material, the first material being different than the second material; and
- wherein a latch member in conjunction with the first pivot point connects the first arm segment to the second arm segment.

* * * * *